(12) United States Patent
Belkin

(10) Patent No.: US 6,766,349 B1
(45) Date of Patent: *Jul. 20, 2004

(54) MECHANISM FOR OBTAINING A THREAD FROM, AND RETURNING A THREAD TO, A THREAD POOL WITHOUT ATTACHING AND DETACHING

(75) Inventor: Ruslan Belkin, Mountain View, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/573,698

(22) Filed: May 19, 2000

Related U.S. Application Data

(60) Provisional application No. 60/156,305, filed on Sep. 24, 1999, and provisional application No. 60/155,771, filed on Sep. 27, 1999.

(51) Int. Cl.[7] .................................................. G06F 9/00
(52) U.S. Cl. ...................... 709/104; 709/102; 709/103; 709/105; 709/106; 709/107; 709/108; 709/201; 709/202; 709/203; 709/226; 709/328; 707/10; 707/102; 717/171; 717/176
(58) Field of Search ............................... 709/102, 103, 709/104, 203, 328, 201–202, 226, 105–108; 707/9, 10, 102; 717/171, 176

(56) References Cited

U.S. PATENT DOCUMENTS

| | | |
|---|---|---|
| 5,329,589 A | 7/1994 | Fraser et al. |
| 5,410,698 A | 4/1995 | Danneels et al. ............ 709/331 |
| 5,586,312 A | 12/1996 | Johnson et al. ............... 707/10 |
| 5,691,973 A | 11/1997 | Ramstrom et al. .......... 379/252 |
| 5,752,031 A | 5/1998 | Cutler et al. |
| 5,790,790 A | 8/1998 | Smith et al. ................. 709/206 |
| 5,793,415 A | 8/1998 | Gregory, III et al. ...... 348/14.1 |
| 5,796,393 A | 8/1998 | MacNaughton et al. |
| 5,809,145 A | 9/1998 | Slik et al. ..................... 705/52 |

(List continued on next page.)

OTHER PUBLICATIONS

"System for Dispatching from Multiple Thread Pools", Jan. 1, 1998, IBM Technical Disclosure Bulletin, vol. 41, issue No. 1, pp. 329–332.

Primary Examiner—Kenneth R. Coulter
Assistant Examiner—Hai V. Nguyen
(74) Attorney, Agent, or Firm—Hickman Palermo Truong & Becker LLP; Christian A. Nicholes; Bobby K. Truong

(57) ABSTRACT

A JAVA application is typically executed as follows. First, a thread from a thread pool is attached to the JAVA virtual machine (JVM). Then, that thread is used to execute the JAVA application. Once the execution of the JAVA application is completed, the thread is detached from the JVM and returned to the thread pool. This is repeated for every execution of a JAVA application. Because this constant attaching and detaching of threads imposes additional overhead on the system, this process is inefficient. To improve the efficiency of the execution process, a "sticky attach" mechanism is provided. With sticky attach, a thread is not attached and detached from the JVM each time a JAVA application is executed. Rather, a thread is attached to the JVM only once: the first time it is used to execute a JAVA application. When execution of the JAVA application is completed, the thread is returned to the thread pool without detaching from the JVM. That way, the next time that thread is obtained from the thread pool, there will be no need to reattach it to the JVM. It will already be attached. Thus, it can be used as is to execute a JAVA application. By eliminating the need to constantly attach and detach threads, the sticky attach mechanism significantly decreases overhead. This in turn increases overall system efficiency.

30 Claims, 6 Drawing Sheets

U.S. PATENT DOCUMENTS

| | | | |
|---|---|---|---|
| 5,809,248 A | 9/1998 | Vidovic | 709/219 |
| 5,835,724 A | 11/1998 | Smith | 709/227 |
| 5,872,963 A | 2/1999 | Bitar et al. | 712/233 |
| 5,913,029 A | 6/1999 | Shostak | |
| 5,918,228 A | 6/1999 | Rich et al. | 707/10 |
| 5,928,323 A | 7/1999 | Gosling et al. | 709/203 |
| 5,961,584 A | 10/1999 | Wolf | 709/103 |
| 5,991,792 A | 11/1999 | Nageswaran | 709/102 |
| 6,012,090 A | 1/2000 | Chung et al. | 709/219 |
| 6,014,666 A * | 1/2000 | Helland et al. | 707/9 |
| 6,052,711 A | 4/2000 | Gish | 709/203 |
| 6,058,460 A | 5/2000 | Nakhimovsky | |
| 6,076,108 A | 6/2000 | Courts et al. | 709/227 |
| 6,088,728 A | 7/2000 | Bellemore et al. | 709/227 |
| 6,098,093 A | 8/2000 | Bayeh et al. | 709/203 |
| 6,112,196 A | 8/2000 | Zimowski et al. | 707/2 |
| 6,125,382 A * | 9/2000 | Brobst et al. | 709/102 |
| 6,128,644 A | 10/2000 | Nozaki | 709/203 |
| 6,141,684 A | 10/2000 | McDonald et al. | 709/222 |
| 6,163,801 A | 12/2000 | O'Donnell et al. | |
| 6,182,109 B1 * | 1/2001 | Sharma et al. | 709/104 |
| 6,209,018 B1 | 3/2001 | Ben-Shachar et al. | 709/105 |
| 6,237,024 B1 * | 5/2001 | Wollrath et al. | 709/203 |
| 6,249,844 B1 | 6/2001 | Schloss et al. | |
| 6,253,239 B1 | 6/2001 | Shklar et al. | |
| 6,260,077 B1 * | 7/2001 | Rangarajan et al. | 709/328 |
| 6,266,661 B1 | 7/2001 | Lewish et al. | 707/3 |
| 6,304,967 B1 | 10/2001 | Braddy | 713/150 |
| 6,314,093 B1 | 11/2001 | Mann et al. | |
| 6,317,742 B1 | 11/2001 | Nagaratnam et al. | 707/9 |
| 6,336,135 B1 | 1/2002 | Niblett et al. | 709/215 |
| 6,338,064 B1 | 1/2002 | Ault et al. | 707/9 |
| 6,374,286 B1 | 4/2002 | Gee et al. | |
| 6,393,477 B1 | 5/2002 | Paxhia et al. | |
| 6,397,253 B1 * | 5/2002 | Quinlan et al. | 709/227 |
| 6,415,329 B1 | 7/2002 | Gelman et al. | |
| 6,490,624 B1 | 12/2002 | Sampson et al. | 709/227 |
| 6,542,920 B1 * | 4/2003 | Belkin et al. | 709/104 |
| 6,549,996 B1 | 4/2003 | Manry, IV et al. | 711/203 |
| 6,557,038 B1 | 4/2003 | Becker et al. | 709/227 |
| 6,564,252 B1 | 5/2003 | Hickman et al. | |
| 6,604,125 B1 * | 8/2003 | Belkin | 709/104 |
| 2004/0064564 A1 | 4/2004 | Belkin | |

* cited by examiner

THREAD POOL CONFIGURATION TABLE

| POOL ID 202 | THREAD TYPE 204 | INITIAL # OF THREADS 206 | MAXIMUM # OF THREADS 208 | THROTTLE 210 | STACK SIZE 212 | MAX QUEUE LENGTH 214 | MAX TIME OUT 216 | ADD'L PRIVATE STORAGE 218 | EVALUATION FUNCTION 220 |
|---|---|---|---|---|---|---|---|---|---|
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |

ASSOCIATION TABLE 300a

| SERVICE TYPE 302 | POOL ID 304 | POINTER TO POOL 306 |
|---|---|---|
| JAVA | | |
| CGI | | |
| HTML | | |
| . . . . . | . . . . . | . . . . . |

ASSOCIATION TABLE 300b

| URI PREFIX 308 | POOL ID 310 | POINTER TO POOL 312 |
|---|---|---|
| LEGACY CODE | | |
| . . . . . | . . . . . | . . . . . |

Fig. 3

MECHANISM FOR OBTAINING A THREAD FROM, AND RETURNING A THREAD TO, A THREAD POOL WITHOUT ATTACHING AND DETACHING

This application claims the benefit of U.S. Provisional Application entitled "Web Server Architecture", No. 60/156,305, filed Sep. 24, 1999, and U.S. Provisional Application entitled "Web Server Architecture", No. 60/155,771, filed Sep. 27 1999. The entire contents of these provisional applications are hereby incorporated by reference.

BACKGROUND

This invention relates generally to computer systems, and more particularly to a mechanism for obtaining a thread from, and returning a thread to, a thread pool without attaching and detaching.

Many of today's high capacity computers, such as web servers, are required to process a large number of requests concurrently. To enable them to do so efficiently, many of these computer systems implement a technique known as multi-threading. In a multi-threaded system, there is allocated within a single process space a plurality of "threads" of execution. Each thread of execution has its own private stack, and each thread is used to execute a specific set of computer code at a time. During execution, each thread uses its stack to maintain state and other information specific to that thread of execution. This thread-specific information cannot be accessed or altered by other threads. As a result, each thread can execute code independent of other threads. It is this ability of threads to execute code independently that makes it possible for multiple threads to service multiple requests concurrently. While each thread can maintain its own set of private information, each thread can also share information with other threads within the same process space. This information sharing is carried out much more easily than in multi-processing systems (where inter-process communication is needed). These two properties, among others, make multi-threading an advantageous mechanism for concurrently servicing multiple requests.

In a typical multi-threaded system, multi-threading is implemented by first giving rise to a process space (e.g. by running an instance of a particular program, such as a web server program). Then, a plurality of threads (referred to herein as a thread pool) are allocated within that process space. In allocating the threads, each thread is given a unique thread ID, and each thread is allocated a stack having a particular size, where all of the threads within the thread pool are given the same stack size. Once the process space is created and the thread pool is allocated, the system is ready to service requests. When a request is received, the system determines whether the thread pool has an available thread. If so, then a thread is assigned to the request, and that thread is used to service the request. By servicing a request, it is meant that a set of code is executed to carry out the functions needed to satisfy the request. The execution of the set of code is carried out using the assigned thread and its associated stack. Multiple requests can be serviced concurrently; thus, if another request is received, then another thread is assigned to that other request, and that other thread is used to service the request. The two threads will execute independent of each other. As a result, the two requests can be serviced concurrently.

At some point, all of the execution that needs to be done to satisfy a request is completed. Once that point is reached, the thread assigned to the request is returned to the thread pool, and is thereafter free to be used to service another request. In the manner described, threads are assigned from the thread pool when needed, and threads are returned to the thread pool when servicing is completed.

The current methodology for implementing multi-threading described above is effective when all of the services demanded by the requests have substantially the same requirements. However, when the requirements of the services differ substantially, the current methodology can lead to inefficiencies. To illustrate this problem, suppose that a system is required to provide two different types of services in response to requests: (1) a lightweight service (such as an HTML static file retrieval service provided by a web server); and (2) a heavyweight service (such as a JAVA-type service). For the lightweight service, it would be optimal to have a large number of threads, with each thread having a small stack. The large number of threads allows a large number of requests to be serviced concurrently, while the small stacks conserve memory. In contrast, for the heavyweight service, it would be optimal to have a small number of threads, with each thread having a large stack. The small number of threads prevents the system from being overburdened by heavyweight requests, while the large stack size is needed for proper execution of the heavyweight service. Clearly, the requirements of these service types conflict.

To accommodate both in a single system, the current methodology has to reach a compromise. Typically, the compromise is a combination of the extremes, namely, a thread pool with a small number of threads, with each thread having a large stack size. On the positive side, this compromise ensures that even in the worst case scenario, where all of the threads are used for heavyweight services, the system will still function adequately. On the negative side, though, this compromise leads to inefficiencies. The small number of threads unnecessarily limits the number of lightweight services that can be provided at any one time, and the large stack size causes memory waste (the lightweight services do not need large stacks). As this discussion illustrates, the current methodology sacrifices efficiency in the general case to ensure proper operation in the worst case, which clearly is an undesirable result. To achieve greater system efficiency, an improved mechanism for implementing multi-threading is needed.

SUMMARY OF THE INVENTION

The present invention provides a more efficient mechanism for implementing multi-threading in a computer system. The present invention is based, at least partially, upon the observation that the inefficiencies of the current methodology stem from the fact that only one thread pool is used. With just one thread pool, it is necessary to make the compromise discussed above. However, if a plurality of thread pools is implemented, with each thread pool customized for one or more particular types of service, then no compromise is needed. When one type of service is needed, a thread from the customized pool associated with that type of service is used. When another type of service is needed, a thread from the customized pool associated with that other type of service is used. There is no need to use one type of thread (e.g. a heavyweight thread) when another type of thread (e.g. a lightweight thread) is needed. By implementing multiple thread pools, the present invention eliminates many if not all of the inefficiencies of the current methodology.

In light of this observation, there is provided an improved mechanism for servicing requests in a multi-threaded system. Initially, a plurality of thread pools is allocated within a process space, with each thread pool comprising one or more threads. Each thread pool has a set of characteristics associated therewith, and in one embodiment, the characteristics of each thread pool are customized for one or more particular types of service. The characteristics of a thread pool may include but are not limited to: (1) the maximum number of threads that can be allocated in that thread pool; (2) the stack size of each thread within that thread pool; and (3) optionally, whether each thread in that thread pool has additional private storage. These characteristics may be set such that they are optimal for particular types of services. For example, for a thread pool customized for lightweight services, the characteristics may be set such that the number of threads in the thread pool is large, and the stack size is small. In contrast, for a thread pool customized for heavyweight services, the characteristics may be set such that the number of threads is small, and the stack size is large. Each thread pool may have its characteristics customized for one or more types of service.

After the thread pools have been allocated, the system is ready to service requests. When a request is received, it is processed to determine with which thread pool the request is to be associated. In one embodiment, this processing is carried out by determining the type of service being requested by the request, and then determining which thread pool is associated with that type of service. In another embodiment, this processing is carried out by extracting a set of indication information (e.g. a universal resource identifier) from the request, and then determining which thread pool is associated with that set of indication information. Once the proper thread pool is determined, a thread from that thread pool is used to carry out servicing of the request. By servicing the request, it is meant that a set of code is executed to carry out the functions needed to satisfy the request. The execution of the set of code is carried out using the assigned thread and its associated stack. In this manner, the request is serviced. Because the request is serviced using a thread from the thread pool customized for the type of service being requested, the servicing of the request is optimized. This in turn optimizes system performance.

One of the thread pools that may be defined and allocated within a process space is a thread pool associated with JAVA type services. Because threads from this thread pool may be used to execute JAVA type applications, they are subject to more processing than most other threads. In particular, they are subject to regular attachment and detachment from a JAVA virtual machine (JVM). Typically, a thread is attached to the JVM prior to being used to execute any JAVA application, and that same thread is detached from the JVM once execution of the JAVA application 132 is completed. This process of constantly attaching and detaching threads from the JVM is inefficient. To increase system efficiency, the present invention further provides a "sticky attach" mechanism. With this mechanism, it is possible to return a thread to the JAVA associated thread pool without detaching the thread from the JVM. Because the thread is returned to the thread pool without detaching, it can be retrieved from the thread pool and used again to execute a JAVA application without reattaching. This allows a thread to be attached to the JVM just once and used to execute an unlimited number of JAVA applications. By eliminating the need to attach and detach a thread each time a JAVA application is executed, the present invention significantly reduces the amount of overhead incurred. This in turn significantly increases the efficiency of the system.

BRIEF DESCRIPTION OF THE DRAWINGS

FIG. 2 shows an embodiment of a thread pool configuration table that may be used by a user to define and to specify characteristics of one or more thread pools.

FIG. 3 shows possible embodiments of association tables that may be used by a user to specify associations between thread pools and services types, and between thread pools and URI's.

DETAILED DESCRIPTION OF EMBODIMENT(S)

Figure 1:
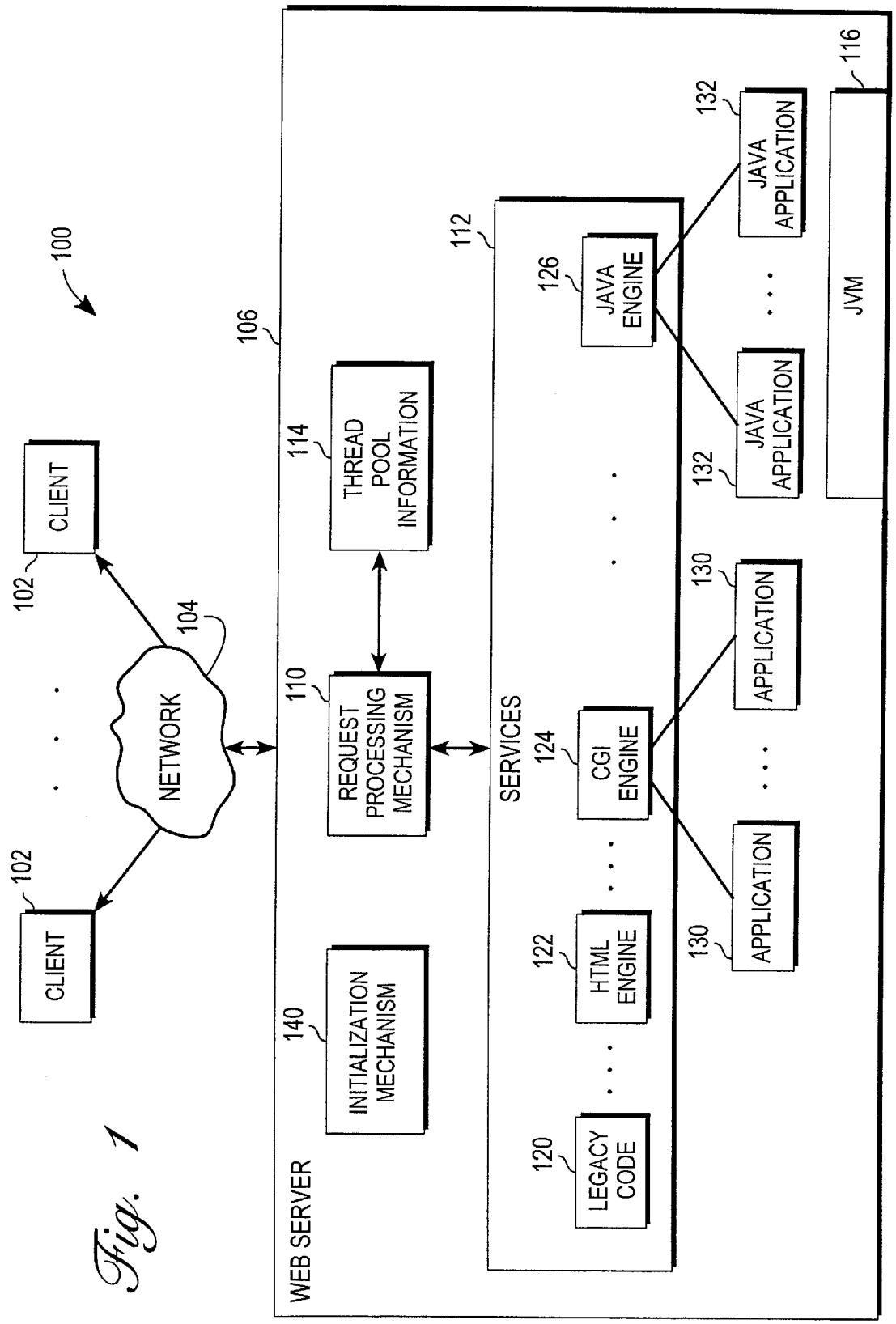
FIG. 1 is a functional block diagram of a system in which one embodiment of the present invention may be implemented.

With reference to FIG. 1, there is shown a functional block diagram of a system 100 in which one embodiment of the present invention may be implemented, the system comprising a plurality of clients 102, a network 104, and a web server 106. For the sake of illustration, the invention will be described with reference to a web server 106, but it should be noted that the invention is not so limited. Rather, the invention may be implemented in any type of server or computer system in which it is desirable to implement multi-threading.

For purposes of the present invention, the client 102 may be any mechanism capable of communicating with the server 106, including but not limited to a computer running a browser program. The client 102 may communicate with the server 106 using any known protocol, including but not limited to HTTP and FTP, and the client 102 communicates with the server 106 via the network 104. The network 104 may be any type of network, including but not limited to a local area network and a wide area network such as the Internet. The network 104 may even be as simple as a direct connection. Any mechanism capable of facilitating communication between the clients 102 and the server 106 may serve as the network 104.

The server 106 is the component responsible for providing most of the functionality of the system 100. More specifically, the server 106 receives requests from the clients 102, and responds to the requests by providing response pages. The response pages may be derived by simply accessing static files, or by executing one or more applications to dynamically generate the response pages. The term application is used broadly herein to refer to any type of program or routine (e.g. a Java servlet) that is capable of performing one or more particular functions. What types of services need to be provided by the server 106 to derive the response pages is typically specified in the requests.

In servicing the requests, the server 106 implements multi-threading. That is, within the server 106, there are multiple threads of execution, with each thread capable of independent execution. Because each thread is capable of executing independently, multiple threads can service multiple requests concurrently. In addition, the server 106 implements multiple thread pools. Each thread pool comprises one or more threads, and each thread pool has associated with it a set of characteristics. In one embodiment, the characteristics of each thread pool are set such that they are customized for one or more types of service. Each of the threads in the server 106 belongs within one of the thread pools.

With multiple thread pools, requests are serviced slightly differently than with a single thread pool. More specifically, when a request is received, the request is first processed to determine with which thread pool the request is to be associated. This determination may be made in one of many ways, as will be discussed in a later section. In one embodiment, the thread pool that is associated with the request is the one that is customized for the type of service being requested by the request. Once the proper thread pool is determined, a thread from that thread pool is assigned to the request. Thereafter, the assigned thread is used to service the request. In servicing the request, the assigned thread and its associated stack are used to execute any computer code that is necessary for servicing the request. Because the thread that is actually used to service the request is from the thread pool customized for the type of service being requested, servicing of the request will be optimized. This in turn helps to optimize the overall operation of the server 106. The server 106 and the manner in which multiple thread pools is implemented will now be described in greater detail.

In one embodiment, the server 106 comprises a request processing mechanism 110, a set of services 112, a set of thread pool information 114, and an initialization mechanism 140. The initialization mechanism 140 is invoked upon system start-up to create all of the thread pools that will be used in the server 106. In performing this task, the initialization mechanism 140 uses the information contained in the thread pool information 114, as will be described in a later section.

In server 106, the request processing mechanism 110 is the component primarily responsible for receiving incoming requests, determining which service or services 112 need to be invoked to service the requests, and then assigning threads from the appropriate thread pools to be used by the services 112 to service the requests. In assigning the threads, the request processing mechanism 110 uses the information in the set of thread pool information 114 to determine the proper thread pools from which the threads should be taken. The manner in which the request processing mechanism 110 determines which service to invoke, and assigns the threads, will be described in detail in a later section.

Depending upon the request, various services 112 within the server 106 may be invoked in order to service the request. For example, if the request is a simple request for an HTML page, then the request processing mechanism 110 forwards the request on to HTML engine 122 for further servicing. On the other hand, if the request is for a common gateway interface (CGI) program, then the request processing mechanism 110 forwards the request on to the CGI engine 124 for servicing. In response, the CGI engine 124 invokes one or more CGI applications 130. If the request is for a JAVA type service, then the request processing mechanism 110 forwards the request on to the JAVA services engine 126. In turn, the JAVA services engine 126 invokes one or more JAVA type applications 132 (e.g. servelets, server pages, JAVA programs, etc.). To run JAVA type applications, a JAVA virtual machine (JVM) 116 is needed. Hence, a JVM 116 may be incorporated into the server 106. The request may also request other types of services, such as certain legacy code 120. If that is the case, then the request processing mechanism 110 invokes the legacy code 120 to further service the request. The services 112 mentioned thus far are just some examples of the types of services that may be provided by the server 106. Other services may also be provided within the spirit of the invention.

In servicing a request, each of the services 112 uses a particular thread from a particular thread pool to carry out the execution of code necessary for servicing the request. Which thread and which thread pool the thread comes from is determined by the request processing mechanism 110. In making this determination, the request processing mechanism 110 uses the information contained in the set of thread pool information 114. With reference to FIGS. 2 and 3, the contents of the thread pool information 114 will now be described in detail.

In one embodiment, the thread pool information 114 first comprises a thread pool configuration table 200 (FIG. 2). It is in this table 200 that all of the thread pools within the server 106 are specified and defined. Each row of the table represents a particular thread pool in the server 106, and each column specifies a characteristic or parameter of each thread pool. The information in table 200 is specifiable by a user. Thus, depending upon the types of services 112 that are provided by the server 106, a user may choose to specify certain thread pools for certain services. The ability to freely specify thread pools enables a user to tune the server 106 to fit specific needs.

As shown in FIG. 2, each thread pool has a plurality of characteristics (i.e. columns) associated therewith. These characteristics include but are not limited to: a pool ID 202, a thread type 204, an initial number of threads 206, a maximum number of threads 208, a throttle 210, a stack size 212, a maximum queue length 214, a maximum time out period 216, additional private storage 218, and a reference to an evaluation function 220.

The pool ID column 202 specifies a unique ID associated with a particular thread pool. This ID allows the thread pool to be uniquely identified in the server 106. The thread type column 204 specifies the type of thread that belongs within a particular thread pool. The types of thread that can be in a system vary depending upon the system, but typical thread types include operating system scheduled threads, user or application scheduled threads, user-level operating system scheduled threads, and user-level threads. The next three columns 206, 208, 210 control the number of threads in a particular thread pool. The initial number of threads specifies the number of threads that are allocated to a thread pool when the thread pool is first created by the initialization mechanism 140 (FIG. 1). The maximum number of threads specifies the maximum number of threads that can be within a particular thread pool, and the throttle specifies the increment by which the number of threads in the thread pool may be increased.

The stack size column 212 specifies the size of the stacks allocated to threads within a particular thread pool. All of the threads within a particular thread pool have the same stack size. The maximum queue length 214 and the maximum time out 216 columns determine the behavior of the system when all of the threads in a thread pool are currently being used. The maximum queue length specifies the maximum number of requests that can be waiting for a thread from the thread pool at any one time, and the maximum time out specifies the maximum period of time that a request can wait for a thread from the thread pool before being "timed out". If a request is timed out, then the request is dropped and a "server busy" message is returned to the client 102 submitting the request.

The additional storage column 220 specifies whether the threads in a particular thread pool have additional private storage associated therewith in addition to a stack. Some services (such as JAVA type services) require threads with additional private storage. For thread pools designed to accommodate such service types, additional private storage may be specified. The evaluation function column 220 specifies a reference to a user-provided function that may be invoked when a certain condition is met, for example, when all of the threads in a particular thread pool are currently being used. This column 220 provides a hook that a user can use to execute a special function. The use of column 220 will be elaborated upon in a later section.

Table 200 allows a user to freely define any and all thread pools used in the server 106. Given this ability, a user may define and customize a thread pool for any type of service provided by the server 106. If, for example, the server 106 provides a lightweight service, such as an HTML page retrieval service 122, the user can customize a thread pool for that service type. For such a service type, the user most likely will set the maximum number of threads in the thread pool to a relatively large number so that a large number of requests can be serviced at a time, and the stack size to a relatively small value since only a relatively small amount of memory is needed to provide the lightweight service. Likewise, if the server 106 also provides a heavyweight service, such as a JAVA type service, then the user can customize another thread pool for that service type. For this service type, the user most likely will set the maximum number of threads in the thread pool to a relatively small number so as not to overburden the server 106 with too many concurrent heavyweight requests, and the stack size to a relatively large value to provide sufficient memory for processing the requests. In addition, since JAVA type requests require additional private storage, the user will most likely also specify that the threads in the thread pool have additional private storage associate therewith. Using table 200, the user may define and customize a thread pool for any type of service. Thus far, only efficiency considerations have been given as reasons for implementing multiple thread pools. It should be noted, though, that there are many other reasons. Some of these will be discussed in a later section.

The thread pool configuration table 200 is just one of the sets of information contained within the thread pool information 114. Another set of information is the association table 300 shown in FIG. 3. It is in this table 300 that the user specifies the association between particular thread pools and other components in the server 106. Table 300 may take on many different forms. Two possible forms 300*a*, 300*b* are shown in FIG. 3. Table 300*a* is the form used when it is desirable to associate a particular thread pool with one or more types of service. Table 300*b* is the form used when it is desirable to associate a particular thread pool with a set of indication information, such as the universal resource identifier (URI) prefix of a web request.

In one embodiment, the association table 300*a* comprises a column 302 for the service type (e.g. JAVA, CGI, HTML, etc.), a column 304 for the pool ID of a particular associated thread pool, and a column for the pointer 306 to the thread pool. The pointer to the thread pool column 306 provides a reference to the list of threads currently allocated to a particular thread pool. At the time that a user specifies the association between a thread pool and a particular type of service, this column is left blank. When the thread pool is actually created by the initialization mechanism 140 (FIG. 1) upon system start-up, the mechanism 140 will insert a reference into column 306. This reference may thereafter be used to access the threads in the thread pool.

Each row of table 302 specifies one association between a particular thread pool and a particular type of service. Like table 200, the contents of table 300*a* are specifiable by a user. Thus, with tables 200 and 300*a*, the user can freely define any thread pool, and associate any type of service with any defined thread pool. For example, a separate thread pool may be defined and associated with the HTML service 122 of FIG. 1. Likewise, a separate thread pool may be defined and associated with the CGI service 130, and a separate thread pool may be defined and associated with the JAVA type service 126. Each thread pool may be customized for its associated service type. In addition, a thread pool may be defined and associated with the request processing mechanism 110. In one embodiment, this thread pool is a default thread pool that is created upon system start-up, and is given a relatively large number of threads and a relatively small stack size. Overall, any thread pool may be defined and associated with any type of service, and a single thread pool may be associated with more than one type of service. With tables 200 and 300, a user is given great flexibility in managing the thread pools of the server 106 to optimize system performance. In one embodiment, all of the tables 200, 300 of the thread pool information 114 are modifiable by a user using a simple user interface (not shown), such as a text editor or a simple graphical user interface.

In addition to or in lieu of table 300*a*, there is table 300*b*, which may be used by a user to specify associations between thread pools and specific sets of indication information. Indication information may include but is not limited to any information particularly identifying a specific application or set of code to be invoked. In one embodiment, the indication information takes the form of a URI prefix. In contrast to table 300*a*, which specifies associations between thread pools and types of service, table 300 sets forth associations between thread pools and specific applications. This type of association may be useful, for example, when it is desirable to associate a thread pool with a very specific application, such as a set of legacy code 120 (FIG. 1). This will be discussed in greater detail in a later section. To enable the associations to be made, there is provided in table 300*b* a URI prefix column 308, a pool ID column 310, and a pointer to thread pool column 312. The URI prefix column 308 accepts a URI prefix associated with a specific application or set of code, the pool ID column 310 accepts the ID of a particular thread pool, and the pointer to thread pool column 312 provides a pointer to the actual threads of a thread pool. Like column 306 of table 300*a*, column 312 is left blank at the time that a user specifies the association between a thread pool and a URI prefix. When the thread pool is actually created by the initialization mechanism 140 (FIG. 1) upon system start-up, the mechanism 140 will insert a reference into column 312. This reference may thereafter be used to access the threads in the thread pool.

Figure 4:
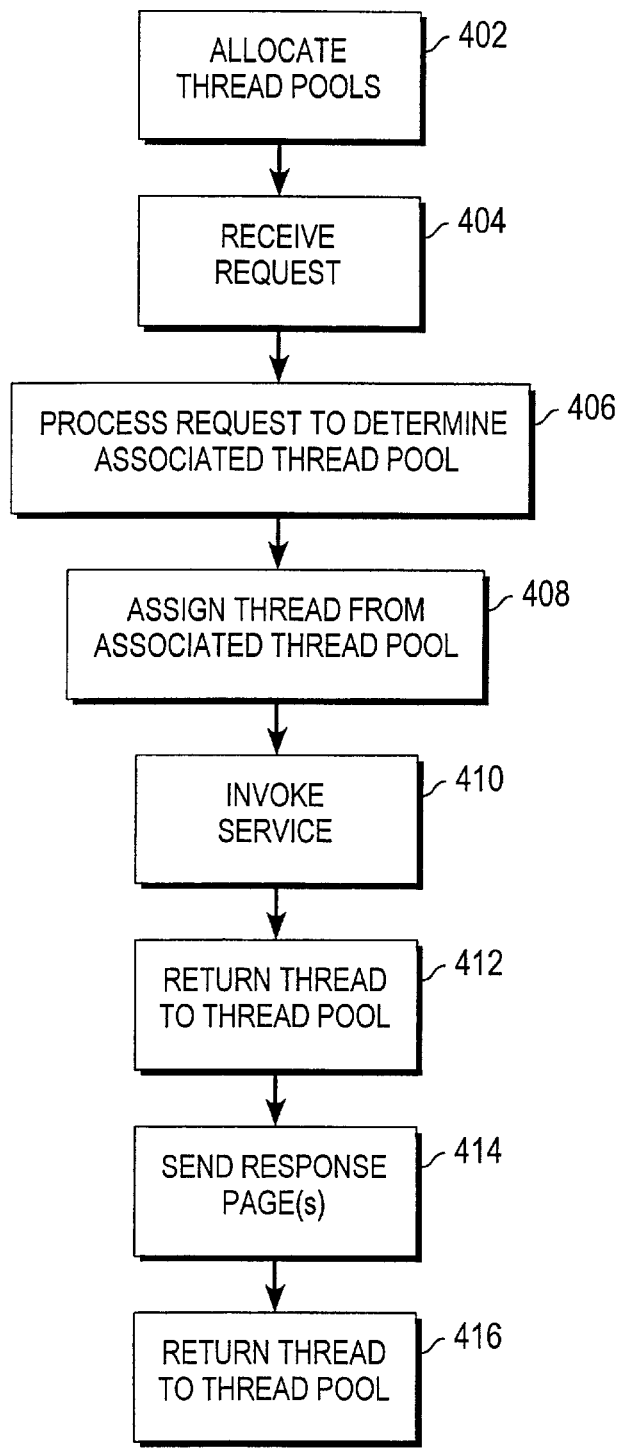
FIG. 4 is a flow diagram illustrating the overall operation of the server in accordance with one embodiment of the present invention.

The structure of the server 106 has been disclosed. With reference to FIGS. 1–3, and the flow diagram of FIG. 4, the operation of the server 106 will now be described. Operation of the server 106 begins with system start-up. At start-up, computer code constituting the server 106 is executed, and this gives rise to a server process space. As part of the start-up process, the initialization mechanism 140 of the server 106 is invoked. When invoked, the initialization mechanism 140 performs a number of initialization functions, one of which is to allocate (402) all of the thread pools that will be used by the server 106. These thread pools are allocated within the server process space that has just been created.

In allocating the thread pools, the initialization mechanism 140 consults the thread pool definitions contained in the thread pool configuration table 200. More specifically, the initialization mechanism 140 inspects each row of the table 200, and for each row, determines the values in the initial number of threads column 206, the stack size column 212, and the additional private storage column 218. Based upon these values, the initialization mechanism 140 allocates a thread pool accordingly. That is, the mechanism 140 creates a number of threads equal to the initial number of threads specified in column 206. Each of these threads is assigned a unique thread ID, and each thread is allocated a stack having the stack size specified in column 212, and additional private storage if so specified in column 218. In addition, each thread is associated with the pool ID of the thread pool that is currently being allocated. Once the threads are allocated, information pertaining to the threads is stored in a structure, such as a list structure or a table, which enables the threads to be easily referenced and accessed. A reference to this structure is then derived and stored. In one embodiment, the reference or pointer to the structure is stored in the pointer to thread pool column 306, 312 of the association tables 300. The reference is stored in the row or rows corresponding to the appropriate pool ID. The thread pool is thus allocated. This process is repeated for each row of the thread pool configuration table 200 to allocate all of the thread pools defined by a user. In one embodiment, there is at least one default thread pool that is allocated, and this thread pool is the one associated with the request processing mechanism 110. These threads will be used to process incoming requests.

Once all of the thread pools are allocated, the server 106 is ready to service requests from clients 102. When a request is received (404) (at a communications port by a low level mechanism such as an operating system), a thread from the request processing mechanism thread pool is selected. This thread is assigned to and associated with the request, and is thereafter used to execute the computer code constituting the request processing mechanism 110 to process the request. Multiple requests can be processed concurrently; thus, if another request is received, then another thread is selected from the request processing mechanism thread pool, and that thread is used to execute the computer code constituting the request processing mechanism 110 to process the request.

In processing a request, the request processing mechanism 110 first determines (406) with which thread pool the request is to be associated. In one embodiment, this determination involves up to two inquiries. The first inquiry is whether the request is requesting a functionality that has a specific thread pool associated therewith. In one embodiment, this inquiry is made by consulting the association table 300b. More specifically, the request processing mechanism 110 extracts from the request a set of indication information, such as a URI prefix, and then compares that information with the information stored in the URI prefix column 308 of the association table 300b. If a matching entry is found, then the pool ID corresponding to the matching entry is the ID of the pool with which the request is to be associated. The associated thread pool is thus determined. On the other hand, if no matching entry is found in table 300b, then a second inquiry is made.

The second inquiry involves making a determination as to the type of service that is being requested by the request. In one embodiment, this is done by executing one or more name translation functions. More specifically, in one embodiment, there is a name translation function associated with most if not all of the services 112 provided by the server 106. The name translation functions determine, based upon the URI of the request, which of the services 112 needs to be invoked to service the request. These name translation functions are executed in turn. For example, the name translation function associated with the HTML engine 122 is invoked first to determine whether the HTML engine 122 needs to be invoked to service the request. If not, then the name translation function associated with the CGI engine 124 is invoked to determine whether the CGI service engine 124 needs to be invoked to respond to the request. This process of executing the name translation functions continues until it is determined which type of service is being requested by the request. Once the service type is determined, it is compared with the service types stored in the service type column 302 of the association table 300a. Unless there is an error, there should be a match between the service type of the request and one of the entries in table 300a. Once a matching entry is found, the pool ID corresponding to the matching entry is the ID of the pool with which the request is to be associated. The associated thread pool is thus determined.

However the associated thread pool is determined (using the first or the second inquiry), once the request processing mechanism 110 knows the associated thread pool, it references the threads in the thread pool using a pointer. Depending upon how the associated thread pool was determined, this pointer may come from column 306 of table 300a, or from column 312 of table 300b. Once the threads in the thread pool are accessed, a free thread from the thread pool is assigned (408) and associated with the request. The assigned thread is thereafter used to service the request. More specifically, the request processing mechanism 110 invokes (410) the service 112 requested by the request, and passes the request to the service 112. In invoking the service 112, the request processing mechanism 110 provides to the service 112 the assigned thread. The invoked service 112 thereafter uses the assigned thread to execute the computer code necessary for servicing the request. As an example, suppose that the request is for a JAVA type service. In such a case, the request processing mechanism 110 invokes the JAVA engine 126, passes the request to the JAVA engine 126, and provides to the engine 126 a thread from the thread pool associated with JAVA type services. That thread is thereafter used to execute the computer code constituting the JAVA engine 126. That same thread may also be used to execute whatever application(s) 132 are needed to provide the desired functionality.

Note that in passing the request from the request processing mechanism 110 to one of the services 112, there is a thread transition. Originally, the request was being processed using a thread from the request processing mechanism thread pool. After the pass-off, the request is being processed using a thread from another thread pool (e.g. the JAVA services thread pool). To facilitate this transition, the request processing mechanism 110 performs all of the necessary context switching. Once the request is passed on to one of the services 112, the request processing mechanism 110 has completed its task. Therefore, the request processing mechanism thread used to execute the request processing mechanism code 110 is no longer needed. Accordingly, this thread is returned (412) to the request processing mechanism thread pool, where is it free to process another request.

Upon receiving the request and the assigned thread from the request processing mechanism 110, one of the services 112 proceeds to service the request. The servicing of the request may involve executing one or more applications 130, 132. This execution is carried out using the assigned thread and its associated stack and private storage (if any). At some point, servicing of the request by the service 112 is completed. When that occurs, one or more response pages are generated and sent (414) by the service 112 to the client 102 submitting the request. At that point, the request is fully serviced. After the request is serviced, there is no longer any need for the assigned thread. Thus, it is returned (416) to the thread pool from which it was obtained, where it is free to be used to service other requests. In the manner described, processing of a request is achieved.

As noted above, one of the thread pools that may be defined and allocated within the server 110 is the thread pool associated with JAVA type services. In one embodiment, threads from this thread pool are used whenever JAVA type services are provided, and these threads are used to execute both the code constituting the JAVA services engine 126 and the code constituting the one or more JAVA applications 132. Because threads from this thread pool are used to execute JAVA type applications 132, they are subject to more processing than most other threads.

In particular, they are subject to regular attachment and detachment from the JAVA virtual machine (JVM) 116. Typically, a thread is attached to the JVM 116 prior to being used to execute any JAVA application 132, and that same thread is detached from the JVM 116 once execution of the JAVA application 132 is completed. As will be elaborated upon below, the process of attaching and detaching a thread from the JVM 116 is an expensive process. Thus, this constant attaching and detaching of threads is quite costly in terms of processing time. To minimize the amount of attachment/detachment that needs to be done, the present invention further provides a "sticky attach" mechanism. With this mechanism, it is possible to return a thread to the JAVA associated thread pool without detaching the thread from the JVM 116. Because the thread is returned to the thread pool without detaching, it can be retrieved from the thread pool and used again to execute a JAVA application 132 without reattaching. This allows a thread to be attached to the JVM 116 just once and used to execute an unlimited number of JAVA applications 132. By eliminating the need to attach and detach a thread each time a JAVA application 132 is executed, the present invention significantly reduces the amount of overhead incurred by the server 106. This in turn significantly increases the efficiency of the server 106. The manner of implementing sticky attach will be described in detail below, but before that, some background information will be provided to facilitate a complete understanding of the invention.

Typically, a thread is attached to the JVM 116 by invoking the JNI_AttachThread procedure of the JVM 116. When invoked, this procedure performs two major functions. First, it registers the thread with the JVM 116. More specifically, it stores the thread ID of the thread being attached into the internal structures of the JVM 116. This causes the JVM 116 to recognize the thread as a JAVA attached thread so that when the JVM 116 performs any action involving attached threads, it will perform the action on this thread. For example, when the JVM 116 performs garbage collection, it will suspend this thread before it removes objects from the heap.

A second function performed by the JNI_AttachThread procedure is allocation of a structure, referred to herein as a JAVA environment, to the thread being attached. This structure is stored within the private local storage of the thread (recall that threads used to execute JAVA applications have private local storage), and contains all of the resources needed by the thread to invoke the services of the JVM 116. More specifically, the JAVA environment comprises a method table portion and a local data portion. The method table contains a list of references to the methods of the JVM 116. These references may be used by the thread to invoke the services of the JVM 116 during execution of JAVA applications. The local data portion provides storage for storing local references to objects. As the services of the JVM 116 are invoked during execution of a JAVA application 132, local references to objects will be created. These local references will be stored in the local data portion of the JAVA environment. Overall, the JAVA environment provides the thread with everything that it needs to execute JAVA applications. Once the thread is registered with the JVM 116 and the JAVA environment is allocated to the thread, the thread is attached to the JVM 116 and is ready for use.

To detach a thread from the JVM 116, a reverse process is taken. Namely, a JNI_DetachThread procedure of the JVM 116 is called, and this procedure removes the thread ID of the detaching thread from the JVM, and deletes the JAVA environment from the private local storage of the detaching thread. Once that is done, the thread is fully detached from the JVM 116, and may be returned to its associated thread pool.

As noted above, a typical execution of a JAVA application is carried out as follows. First, a thread from a thread pool is attached to the JVM 116. Then, the attached thread is used to execute the JAVA application. Once the execution of the JAVA application is completed, the thread is detached from the JVM 116 and returned to the thread pool. This is repeated for every JAVA application. As can be seen, this process is inefficient because it requires constant attachment and detachment from the JVM 116.

To eliminate this inefficiency, the sticky attach mechanism of the present invention takes a different approach. Rather than attaching and detaching a thread each time a JAVA application is executed, a thread is attached to the JVM 116 only once: the first time it is used to execute a JAVA application. Once attached, it is used to execute a JAVA application. When it completes execution of the JAVA application, the thread is not detached from the JVM 116. Instead, a small amount of clean up is performed (this will be described in more detail in a later section), and then the thread is returned to the thread pool still attached to the JVM 116. The next time that same thread is obtained from the thread pool, there will be no need to reattach to the JVM 116. Instead, the thread may be used as is to execute a JAVA application. In this manner, the sticky attach mechanism of the present invention enables a thread to be attached only once, and be used to execute an unlimited number of JAVA applications.

Figure 5:
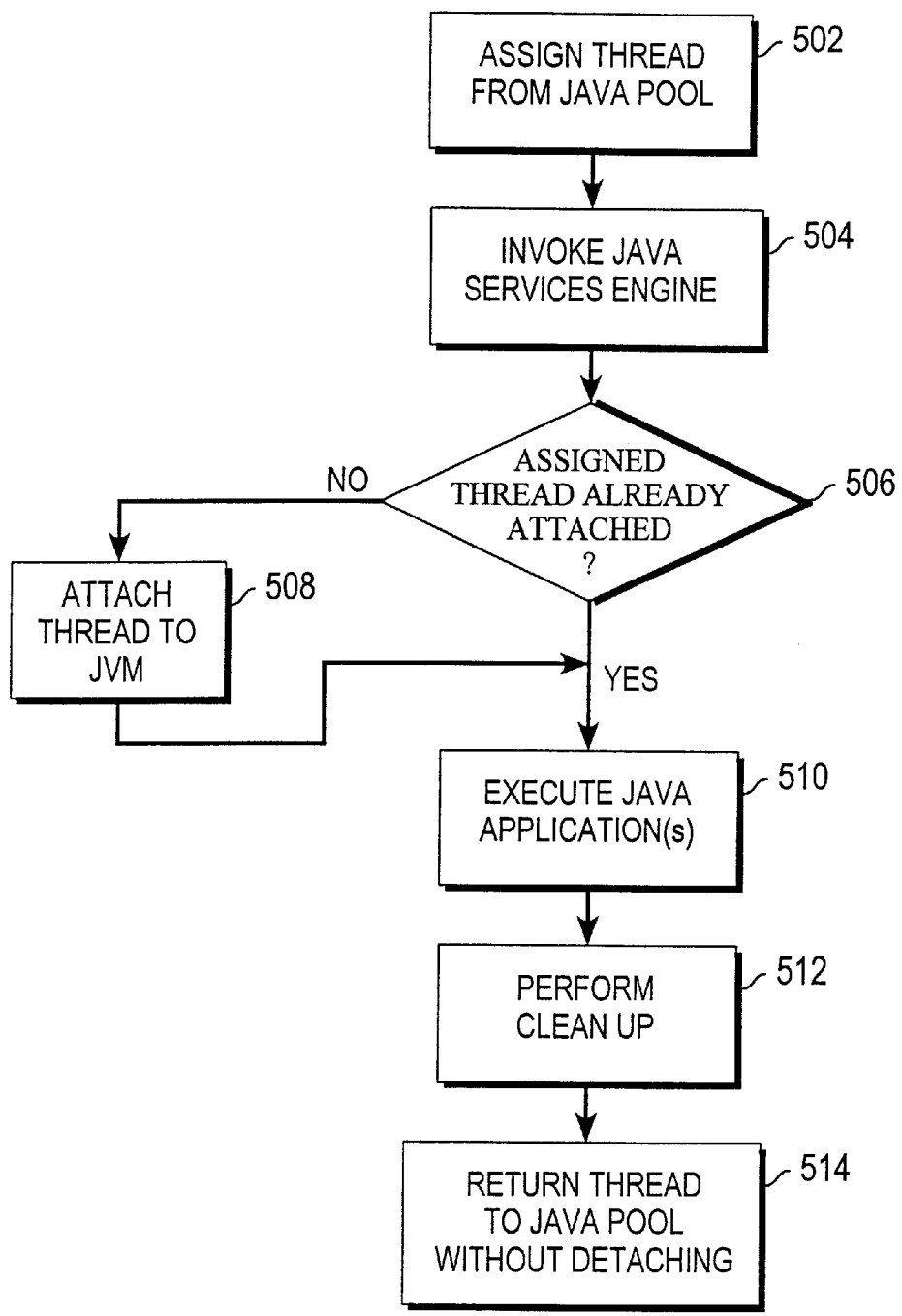
FIG. 5 is a flow diagram illustrating the manner in which one embodiment of the sticky attach mechanism operates.

With reference to FIG. 1, and the flow diagram of FIG. 5, the sticky attach process will now be described in greater detail. The process of initializing the server 106 and processing requests using the request processing mechanism 110 is the same in this process as in the general case described above; thus, these will not be repeated. For purposes of this discussion, it will be assumed that a request has already been processed by the request processing mechanism 110 and determined to involve a JAVA type service. In such a case, the request processing mechanism 110 obtains a free thread from the thread pool associated with JAVA type services, and assigns (502) this thread to the request. Thereafter, the request processing mechanism 110 invokes (504) the JAVA services engine 126, and passes to it the request and the assigned thread. In addition, the request processing mechanism 110 performs all of the necessary context switching. Thereafter, the assigned thread and its associated stack are used to execute the code constituting the JAVA services engine 126. At this point, processing by the request processing mechanism 110 is completed; hence, the thread used to execute the mechanism 110 is returned to the request processing mechanism thread pool.

In servicing the request, the JAVA services engine 126 will most likely invoke one or more of the JAVA applications 132. When invoked, these applications 132 will execute using the assigned thread. Before this occurs, however, the JAVA services engine 126 first determines (506) whether the assigned thread is already attached to the JVM 116. In one embodiment, this is done by checking the private local storage of the assigned thread for the JAVA environment discussed above. If this environment is present, then the thread is already attached to the JVM 116. In such a case, the JAVA services engine 126 may proceed to execute (510) one or more of the JAVA applications 132 using the assigned thread. On the other hand, if the JAVA environment is not present, then the engine 126 proceeds to (508) to attach the thread to the JVM 116.

In one embodiment, the engine 126 attaches the thread to the JVM 116 by invoking the JNI_AttachThread procedure of the JVM 116. As described previously, this procedure stores the ID of the assigned thread into the internal structures of the JVM 116. In addition, it allocates and stores within the private local storage of the assigned thread a JAVA environment structure, comprising a method table portion and a local data portion. Once attached to the JVM 116, the assigned thread may be used to execute (510) one or more JAVA applications 132.

In executing the JAVA applications 132, services of the JVM 116 will be invoked. These services are invoked using the references contained in the method table of the JAVA environment. As the JVM 116 services are invoked, one or more local object references will be created. These references are stored within the local data portion of the JAVA environment. As this discussion shows, the JAVA environment provides a self-contained structure for facilitating execution of JAVA code by the thread. Execution of the JAVA applications 132 continues until the request is fully serviced. At that point, one or more response pages are generated and sent to the client 102 that submitted the request. Servicing of the request is thus completed.

After the request is serviced, it is time to return the assigned thread to the JAVA associated thread pool. Before this is done, however, some clean up operations are performed (512). Among others, these operations include clearing out the assigned thread's stack. In addition, any obsolete object references still stored in the data portion of the JAVA environment are removed. Removal of these references releases the referenced objects, which in turn enables the JVM 116 to perform garbage collection on the objects if there are no other references to them. After the clean up operations are performed, the assigned thread is returned (514) to the JAVA associated thread pool. Notice that the thread is returned to the thread pool without detaching from the JVM 116. That is, the ID of the thread is not removed from the internal structures of the JVM 116. In addition, the JAVA environment is not removed from the private local storage of the thread. Thus, for all intents and purposes, the thread is still attached to the JVM 116. That being the case, the next time that same thread is assigned from the thread pool, no reattachment will be necessary. Rather, the thread may be used as is to immediately execute JAVA applications 132. By removing the need to constantly attach and detach threads, the sticky attach mechanism of the present invention significantly decreases the overhead incurred by the server 106. This in turn increases the efficiency of the overall system.

It was mentioned previously that optimizing system performance is just one of the reasons for implementing multiple thread pools in a system. There are many more reasons, one of which is to enable one or more thread-unaware or non-thread-safe applications to be executed safely in a multi-threaded environment. To elaborate, in many current systems, there exist sets of computer code commonly referred to as legacy code that were developed years ago using old or outdated programming languages or techniques. A majority of this legacy code was written either before multi-threaded technology was developed or was developed without multi-threading in mind, and thus, is thread-unaware. When code is thread-unaware, it does not take into account the possibility that there may be more than one instance of that set of code running in the same process space at the same time. As a result, if multiple instances of the thread-unaware code are executed in the same process space concurrently, as is often the case in multi-threaded systems, serious errors can occur. One of the possible errors is that one instance may modify or overwrite the information used by another instance (this occurs because each instance assumes that it is the only instance in the process space). When this happens, proper execution of the instances can be completely undermined. As a result, it is potentially hazardous to execute thread-unaware legacy code in a multi-threaded environment. While legacy code is often outdated and potentially hazardous, it is still desirable in some implementations to make use of the code. In such implementations, the challenge is to execute the code in such a way that it does not cause system errors or data corruption.

The present invention provides a solution to this problem. Basically, when it is desirable to execute a thread-unaware or non-thread-safe application in a multi-threaded environment, a separate thread pool is defined and associated with the thread-unaware application. Unlike other thread pools, however, this thread pool has its maximum number of threads parameter set to "1". By limiting the number of threads in this thread pool to 1, it is guaranteed that there will be no more than one instance of the application executing at any one time. This in turn precludes any possibility of one instance of the application overwriting or modifying the information used by another. In effect, limiting the number of threads in the thread pool to 1 serializes the execution of the application. If two executed instances of the application are needed, the second instance will start executing only after the first instance has completed execution. By serializing execution, potential problems caused by concurrently executing multiple instances of the thread-unaware application are prevented. In this manner, execution of the thread-unaware application in a multi-threaded environment is made safe.

To enable one or more thread-unaware applications to be executed safely in system 100 of FIG. 1, a user first defines for each thread-unaware application a separate thread pool. This is done by creating an entry in the thread pool configuration table 200 of FIG. 2. In addition to specifying other parameters for this thread pool, such as the pool ID and stack size, the user sets the values in the initial number of threads column 206 and the maximum number of threads column 208 to "1". This guarantees that there will be no more than one thread in the thread pool at any one time. Thereafter, the user associates the thread pool with the thread-unaware application (for the sake of example, it will be assumed that the thread-unaware application is the legacy code 120 of FIG. 1). This may be done by associating a specific URI prefix with the application 120, and then storing this URI prefix into an entry of table 300b in column 308. Also stored into table 300b is the pool ID of the thread pool that the user has just defined (the pool ID is stored in column 310). Once that is done, the application 120 is ready for execution.

At system start-up, the initialization mechanism 140 of the server 106 is invoked. Among other functions, the initialization mechanism 140 creates the thread pool associated with the thread-unaware application 120, and allocates one thread to it. This thread is assigned a thread ID and the proper pool ID, and information pertaining to the thread is stored in a structure, such as a list structure or a table, which enables the thread to be easily referenced and accessed. A reference to this structure is then derived and stored in the pointer to thread pool column 312 of the association table 300b in the row corresponding to the appropriate pool ID. The thread pool is thus allocated. The server 106 is now ready to service requests.

When a request for the thread-unaware application 120 is received, the request is processed by the request processing mechanism 110. In processing the request, the mechanism 110 extracts a URI prefix from the request, and compares it with the URI prefixes stored in column 308 of table 300b. Unless there is an error, a matching entry will be found in table 300b for the URI prefix. Once the matching entry is found, the thread pool associated with the thread-unaware application 120 is accessed using the corresponding pointer in column 312. Once the thread pool is accessed, the request processing mechanism 110 determines whether the thread pool has a free thread available. If not, then it means that the one thread in the thread pool is currently being used to execute an instance of the application 120. In such a case, the request processing mechanism 110 waits for the thread to become available. Thus, only one instance of the thread-unaware application 120 can be executed at a time.

On the other hand, if a free thread is available, then the free thread is assigned to the request, and is thereafter used to service the request. More specifically, the request processing mechanism 110 invokes the thread-unaware application 120, passes the request on to the application 120, and provides the free thread to the application 120 for use in servicing the request. In passing the request on to the application 120, the request processing mechanism 110 performs all of the necessary context switching. Once that is done, the thread used to execute the request processing mechanism 110 is returned to the request processing mechanism thread pool. Thereafter, the code associated with the thread-unaware application 120 is executed using the assigned thread to service the request. When the application 120 completes execution, it generates and sends one or more response pages to the client 102 that submitted the request. The request is thus fully serviced. Once that is done, the assigned thread is returned to the thread pool associated with the thread-unaware application 120, where it can be used for another request. In the manner described, the thread-unaware application 120 is executed safely in a multi-threaded environment.

As noted previously in connection with table 200 of FIG. 2, one of the parameters that can be specified for each thread pool is a reference to an evaluation function (column 220). This evaluation function is user-provided, and may be invoked to evaluate a request when one or more conditions are satisfied. When invoked, this function determines, based upon the request, how that request should be processed. Since the evaluation function is user-provided, it may be programmed to perform any desired operations, and to take any desired considerations and factors into account. This ability to define and associate an evaluation function with a thread pool gives a user great flexibility in controlling the functionality of the server 106. When used properly, the evaluation function can be an advantageous and powerful tool.

The advantages offered by the evaluation function are best illustrated with reference to an example. Suppose that the server 106 of FIG. 1 is used to implement an Internet shopping website. On such a site, various types of requests may be received from the clients 102. These requests may range from requests to start a shopping transaction, to requests to add additional items to ongoing transactions, to requests to finalize transactions. To the server 106, these requests are all equal, that is, they are all requests for services. From a business standpoint, however, these requests are not all equal. Rather, the request to finalize a transaction is much more valuable than a request to start a transaction because the request to finalize a transaction is much more likely to produce immediate revenue. In addition, not all requests to finalize transactions are made equal. A request to finalize a $5,000 transaction is much more important than a request to finalize a $5 transaction. As this discussion shows, there are business and other types of reasons for treating different requests differently. The evaluation function allows these considerations to be taken into account in processing requests.

To show one possible use of the evaluation function, suppose that a request is received by the server 106. Suppose further: (1) that the request is processed by the request processing mechanism 110 and determined to be a request for a JAVA type service; and (2) that the thread pool associated with JAVA type services currently has no free threads available. In this situation, the request is typically put onto the queue associated with the thread pool. If the queue is full, or if the maximum time out period has elapsed, then the request is dropped and a "server busy" message is sent back to the client 102 that submitted the request. This may be the desired result for some requests, but if the request is a request to finalize a transaction, especially one with a large transaction amount, it most likely is not the desired result. To prevent this result from being realized, the evaluation function may be used.

To illustrate, when the request processing mechanism 110 determines that there are no free threads in the thread pool, rather than processing the request like any other request, the mechanism 110 may invoke the evaluation function referenced in the evaluation function column 220 of the thread pool. When invoked, the evaluation function analyzes and evaluates the request to determine how the request should be handled. If the evaluation function determines, for example, that the request is a request to finalize a $5,000 transaction, then the evaluation function may place the request at the head rather than the tail of the queue. Alternatively, the evaluation function may ensure that the request will not dropped from the queue but rather, will be serviced even if the maximum time out period has elapsed. On the other hand, if the evaluation function determines that the request is a request to start a transaction, then the evaluation function may simply put the request at the tail of the queue. The evaluation function is user-provided; thus, it may implement any logic desired by the user. In the example given, the condition prompting the execution of the evaluation function is the unavailability of a free thread, the considerations taken into account in evaluating the request are the type of request and the amount of the request, and the actions taken involve placement of the request on the queue and insurance that the request will not be dropped from the queue. It should be noted that these are illustrative only. For purposes of the invention, any conditions (or none at all) may prompt the execution of the evaluation function, any criteria may be taken into account in evaluating the request, and any actions may be taken in disposing of the request. All such possibilities are within the scope of the present invention.

In system 100 shown in FIG. 1, it is the request processing mechanism 110 that is primarily responsible for invoking the evaluation function associated with a thread pool. Thus, it is the request processing mechanism 110 that checks for the conditions (whatever they might be) prompting the execution of the evaluation function. Accordingly, the code constituting the request processing mechanism 110 comprises logic for checking for these conditions. It should be noted that this is just one possible embodiment. Alternatively, the tasks of checking for the proper conditions and invoking the evaluation function may be performed by one or more other components. This and other modifications are within the scope of the present invention.

Thus far, the invocation of the evaluation function has been described in the context of multiple thread pools. However, it should be noted that the invention is not so limited. Rather, if so desired, the concept of the evaluation function may be implemented effectively in a single thread pool environment. This and other modifications are within the scope of the invention.

Hardware Overview

Figure 6:
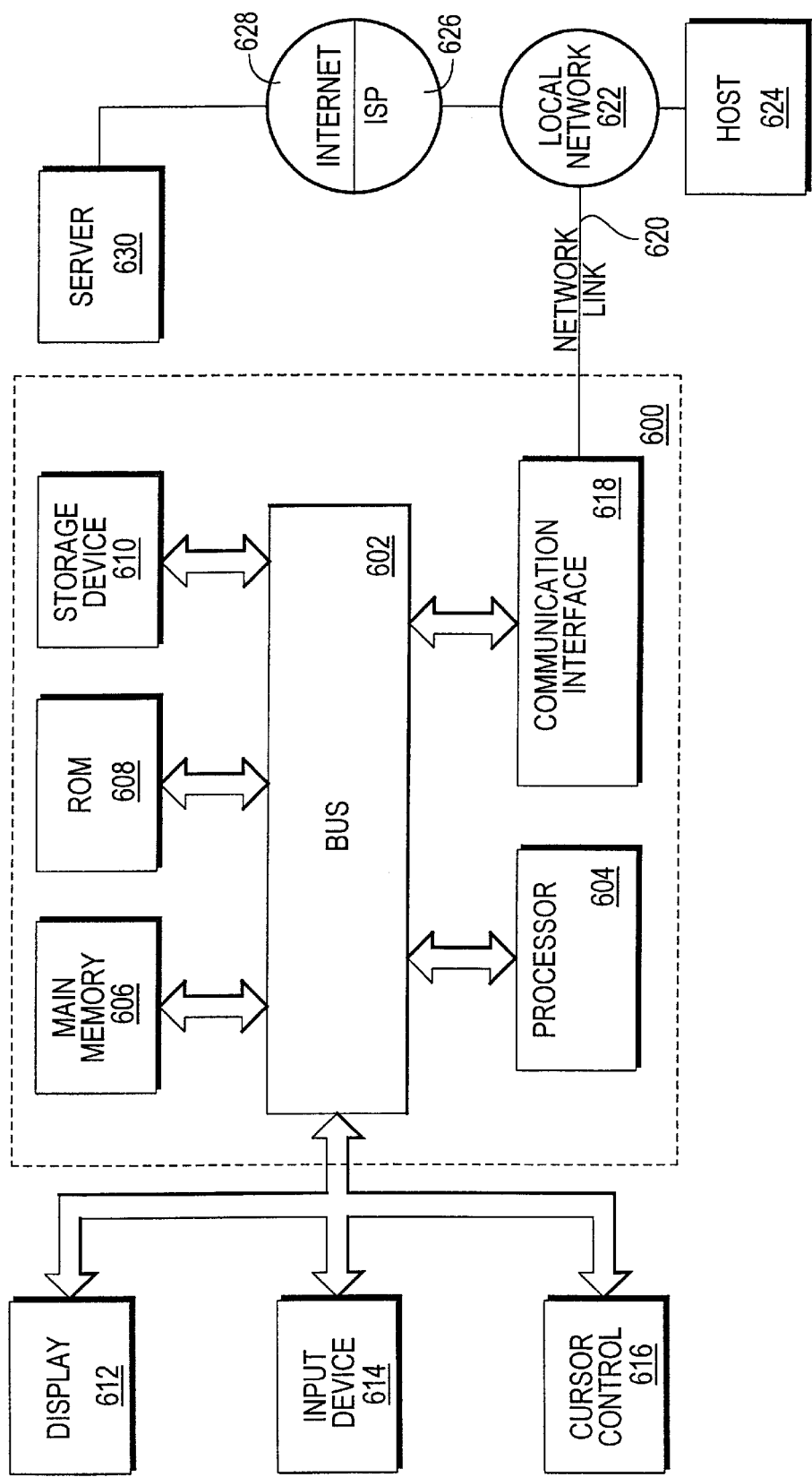
FIG. 6 is a hardware block diagram of a computer system in which the present invention may be implemented.

In one embodiment, the server 106 of the present invention and its various components are implemented as a set of instructions executable by one or more processors. The invention may be implemented as part of an object oriented programming system, including but not limited to the JAVA™ programming system manufactured by Sun Microsystems, Inc. of Mountain View, Calif. FIG. 6 shows a hardware block diagram of a computer system 600 in which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 may also be further used to store temporary variables or other intermediate information during execution of instructions by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

According to one embodiment, the functionality of the present invention is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer implemented method for servicing a request, comprising:

receiving a request for a service which requires invocation of one or more resources provided by an engine;

assigning a thread from a thread pool for use in servicing said request;

determining whether said thread is already attached to said engine, wherein said thread is attached to said engine if said thread is enabled to invoke the one or more resources provided by said engine; and in response to a determination that said thread is already attached to said engine, servicing said request using said thread without first attaching said thread to said engine.

2. The method of claim 1, further comprising:

upon completion of servicing of said request, returning said thread to said thread pool without detaching said thread from said engine.

3. The method of claim 2, wherein said thread has private storage associated therewith, and wherein determining comprises:

determining whether the private storage associated with said thread comprises an environment structure which enables said thread to invoke the one or more resources provided by said engine.

4. The method of claim 3, wherein said environment structure comprises:

one or more references to the one or more resources provided by said engine; and storage for storing local references to data structures pertaining to said engine.

5. The method of claim 2, wherein said thread pool is dedicated to servicing requests requiring invocation of said engine.

6. The method of claim 2, wherein said engine is a JAVA virtual machine (JVM).

7. The method of claim 2, further comprising:

in response to a determination that said thread is not already attached to said engine, attaching said thread to said engine; and servicing said request using said thread.

8. The method of claim 7, wherein attaching comprises:

registering said thread with said engine.

9. The method of claim 8, wherein said thread has private storage associated therewith, and wherein attaching further comprises:

allocating an environment structure within the private storage associated with said thread, said environment structure enabling said thread to invoke the one or more resources provided by said engine.

10. The method of claim 9, wherein said environment structure comprises:

one or more references to the one or more resources provided by said engine; and storage for storing local references to data structures pertaining to said engine.

11. An apparatus for servicing a request, comprising:

a mechanism for receiving a request for a service which requires invocation of one or more resources provided by an engine;

a mechanism for assigning a thread from a thread pool for use in servicing said request;

a mechanism for determining whether said thread is already attached to said engine, wherein said thread is attached to said engine if said thread is enabled to invoke the one or more resources provided by said engine; and a mechanism for servicing, in response to a determination that said thread is already attached to said engine, said request using said thread without first attaching said thread to said engine.

12. The apparatus of claim 11, further comprising:

a mechanism for returning, upon completion of servicing of said request, said thread to said thread pool without detaching said thread from said engine.

13. The apparatus of claim 12, wherein said thread has private storage associated therewith, and wherein the mechanism for determining comprises:

a mechanism for determining whether the private storage associated with said thread comprises an environment structure which enables said thread to invoke the one or more resources provided by said engine.

14. The apparatus of claim 13, wherein said environment structure comprises:

one or more references to the one or more resources provided by said engine; and storage for storing local references to data structures pertaining to said engine.

15. The apparatus of claim 12, wherein said thread pool is dedicated to servicing requests requiring invocation of said engine.

16. The apparatus of claim 12, wherein said engine is a JAVA virtual machine (JVM).

17. The apparatus of claim 12, further comprising:

a mechanism for attaching, in response to a determination that said thread is not already attached to said engine, said thread to said engine; and a mechanism for servicing said request using said thread.

18. The apparatus of claim 17, wherein the mechanism for attaching comprises:

a mechanism for registering said thread with said engine.

19. The apparatus of claim 18, wherein said thread has private storage associated therewith, and wherein the mechanism for attaching further comprises:

a mechanism for allocating an environment structure within the private storage associated with said thread, said environment structure enabling said thread to invoke the one or more resources provided by said engine.

20. The apparatus of claim 19, wherein said environment structure comprises:

one or more references to the one or more resources provided by said engine; and storage for storing local references to data structures pertaining to said engine.

21. A computer readable medium having stored thereon instructions which, when executed by one or more processors, cause the one or more processors to service a request, said computer readable medium comprising:

instructions for causing one or more processors to receive a request for a service which requires invocation of one or more resources provided by an engine;

instructions for causing one or more processors to assign a thread from a thread pool for use in servicing said request;

instructions for causing one or more processors to determine whether said thread is already attached to said engine, wherein said thread is attached to said engine if said thread is enabled to invoke the one or more resources provided by said engine; and instructions for causing one or more processors to service, in response to a determination that said thread is already attached to said engine, said request using said thread without first attaching said thread to said engine.

22. The computer readable medium of claim 21, further comprising:

instructions for causing one or more processors to return, upon completion of servicing of said request, said thread to said thread pool without detaching said thread from said engine.

23. The computer readable medium of claim 22, wherein said thread has private storage associated therewith, and wherein the instructions for causing one or more processors to determine comprises:

instructions for causing one or more processors to determine whether the private storage associated with said thread comprises an environment structure which enables said thread to invoke the one or more resources provided by said engine.

24. The computer readable medium of claim 23, wherein said environment structure comprises:

one or more references to the one or more resources provided by said engine; and storage for storing local references to data structures pertaining to said engine.

25. The computer readable medium of claim 22, wherein said thread pool is dedicated to servicing requests requiring invocation of said engine.

26. The computer readable medium of claim 22, wherein said engine is a JAVA virtual machine (JVM).

27. The computer readable medium of claim 22, further comprising:

instructions for causing one or more processors to attach, in response to a determination that said thread is not already attached to said engine, said thread to said engine; and instructions for causing one or more processors to service said request using said thread.

28. The computer readable medium of claim 27, wherein the instructions for causing one or more processors to attach comprises:

instructions for causing one or more processors to register said thread with said engine.

29. The computer readable medium of claim 28, wherein said thread has private storage associated therewith, and wherein the instructions for causing one or more processors to attach further comprises:

instructions for causing one or more processors to allocate an environment structure within the private storage associated with said thread, said environment structure enabling said thread to invoke the one or more resources provided by said engine.

30. The computer readable medium of claim 29, wherein said environment structure comprises:

one or more references to the one or more resources provided by said engine; and storage for storing local references to data structures pertaining to said engine.

* * * * *

UNITED STATES PATENT AND TRADEMARK OFFICE
CERTIFICATE OF CORRECTION

PATENT NO. : 6,766,349 B1
DATED : July 20, 2004
INVENTOR(S) : Ruslan Belkin

It is certified that error appears in the above-identified patent and that said Letters Patent is hereby corrected as shown below:

Title page,
Item [30], Related U.S. Application Data, "U.S. Provisional Application entitled "Web Server Architecture", No. 60/155,771, filed Sep. 27, 1999" should read -- U.S. Provisional Application entitled "Web Server Architecture", No. 60/155,711, filed Sep. 24, 1999 --.

Signed and Sealed this

Twenty-first Day of December, 2004

JON W. DUDAS
*Director of the United States Patent and Trademark Office*